US012148976B2

(12) United States Patent
Furutani

(10) Patent No.: US 12,148,976 B2
(45) Date of Patent: Nov. 19, 2024

(54) DIRECTIONAL COUPLER

(71) Applicant: Murata Manufacturing Co., Ltd., Kyoto (JP)

(72) Inventor: Koji Furutani, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 309 days.

(21) Appl. No.: 17/819,140

(22) Filed: Aug. 11, 2022

(65) Prior Publication Data

US 2023/0113980 A1 Apr. 13, 2023

(30) Foreign Application Priority Data

Oct. 12, 2021 (JP) ................................ 2021-167646

(51) Int. Cl.
*H01P 5/18* (2006.01)

(52) U.S. Cl.
CPC ...................................... *H01P 5/18* (2013.01)

(58) Field of Classification Search
CPC ..................... H01P 5/185; H01P 5/187; H01L 2924/13091; H01L 2924/15153; H01L 2224/73265; H01L 2224/48227; H01L 2924/15313; H01L 2224/32225; H01L 2924/19105; H01L 2924/00012; H01L 2924/00
See application file for complete search history.

(56) References Cited

U.S. PATENT DOCUMENTS

2001/0043130 A1* 11/2001 Nagamori ............... H01P 5/185 333/101

FOREIGN PATENT DOCUMENTS

JP 2000-165116 A 6/2000

* cited by examiner

*Primary Examiner* — Quan Tra
(74) *Attorney, Agent, or Firm* — Pearne & Gordon LLP

(57) ABSTRACT

A directional coupler includes a substrate, a main line, a first sub-line, and a ground conductor. The main line includes a first conductor line and a second conductor line electrically connected to each other. The first sub-line includes a third conductor line. The first conductor line and the second conductor line are able to be electromagnetically coupled to the third conductor line. The first conductor line has a first edge and a second edge. The second conductor line has a third edge and a fourth edge. The third conductor line has a fifth edge and a sixth edge. The first conductor line, the second conductor line, and the third conductor line are arranged in such a manner that the first edge, the fifth edge, the third edge, the second edge, the sixth edge, and the fourth edge are arranged in this order when the substrate is viewed in plan.

10 Claims, 5 Drawing Sheets

DIRECTIONAL COUPLER

CROSS REFERENCE TO RELATED APPLICATION

This application claims priority from Japanese Patent Application No. 2021-167646 filed on Oct. 12, 2021. The content of this application is incorporated herein by reference in its entirety.

BACKGROUND ART

The present disclosure relates to a directional coupler.

A directional coupler disclosed in Japanese Unexamined Patent Application Publication (JP-A) No. 2000-165116 includes a substrate, a first line conductor, a second line conductor, and a ground conductor. The first line conductor and the second line conductor are electromagnetically coupled to each other. The first line conductor is disposed between the ground conductor and the second line conductor. The width of the second line conductor is greater than the width of the first line conductor. If layers constituting the substrate become misaligned, the first line conductor on the substrate viewed in plan would not lie off edges of the second conductor. Thus, the directional coupler can operate with little or no variation in the degree of coupling between the first line conductor and the second line conductor.

The directional coupler disclosed in JP-A No. 2000-165116 involves the use of a thick substrate in which impedance can be adjusted in such a way as to minimize variation in the degree of coupling.

BRIEF SUMMARY

The present disclosure provides a directional coupler in which impedance can be adjusted in such a way as to minimize variation in the degree of coupling in a substrate without necessarily the need to increase the thickness of the substrate.

A directional coupler includes a substrate, a main line, a first sub-line, and a ground conductor. The substrate includes a plurality of dielectric layers. The main line is disposed in the substrate. The first sub-line is disposed in or on the substrate. The ground conductor is disposed in or on the substrate. The main line includes a first conductor line and a second conductor line that are electrically connected to each other. The first sub-line includes a third conductor line. The first conductor line and the second conductor line are able to be electromagnetically coupled to the third conductor line. The first conductor line and the second conductor line are disposed on different layers of the substrate. The first conductor line, the second conductor line, the third conductor line, and the ground conductor are arranged in an order of the third conductor line, the first conductor line, the second conductor line, and the ground conductor when the substrate is viewed in cross section. The first conductor line has a first edge and a second edge that extend in a longitudinal direction and are located on opposite sides. The second conductor line has a third edge and a fourth edge that extend in a longitudinal direction and are located on opposite sides. The third conductor line has a fifth edge and a sixth edge that extend in a longitudinal direction and are located on opposite sides. The first conductor line, the second conductor line, and the third conductor line are disposed in such a manner that the first edge, the fifth edge, the third edge, the second edge, the sixth edge, and the fourth edge are arranged in this order when the substrate is viewed in plan.

The present disclosure enables impedance adjustment in such a way as to minimize variation in the degree of coupling without necessarily the need to increase the thickness of the substrate.

DETAILED DESCRIPTION

Figure 1:
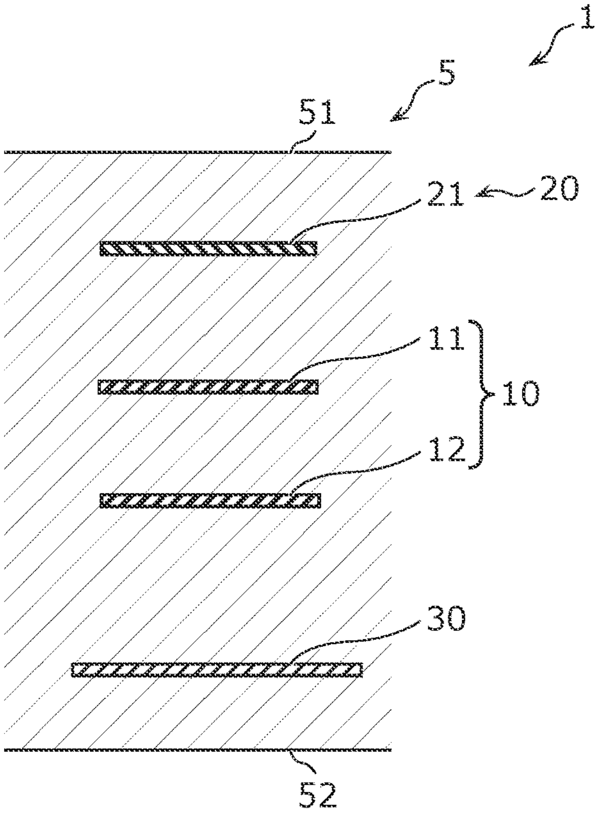
FIG. 1 is a sectional view of an example substrate (directional coupler) according to Embodiment 1.

As mentioned above, one of the features of the directional coupler disclosed in JP-A No. 2000-165116 is that the second line conductor is wider. As the line width increases, the impedance becomes smaller. For this reason, the second line conductor necessitates impedance adjustment, in which case the distance between the ground conductor and the second line conductor is to be increased. In other words, the thickness of the substrate is to be increased. That is, the directional coupler disclosed in JP-A No. 2000-165116 needs to include a thick substrate in which impedance can be adjusted in such a way as to minimize variation in the degree of coupling.

The following describes a directional coupler that enables impedance adjustment in such a way as to minimize variation in the degree of coupling without necessarily the need to increase the thickness of the substrate.

Hereinafter, embodiments of the present disclosure will be described in detail with reference to the accompanying drawings. The following embodiments are general or specific examples. Details, such as values, shapes, materials, constituent elements, and arrangements and connection patterns of the constituent elements in the following embodiments are provided merely as examples and should not be construed as limiting the present disclosure. Of the constituent elements in the following embodiments, those not mentioned in independent claims are described as optional constituent elements. The size and the relative size ratio of each constituent element in the drawings are not necessarily accurate in a strict sense. Redundant description of substantially the same constituent elements, which are denoted by the same reference signs in the drawings, will be omitted or brief description of the elements will be provided where appropriate. The word "connected" in the description of the following embodiments refers not only to direct connection between elements but also to electrical connection between elements with another element (e.g., a capacitor, an inductor, or a semiconductor device, such as a diode or a transistor) therebetween. For example, the expression "connected between A and B" means that an element is located between A and B and connected directly to each of A and B or that an element is located between A and B and connected to each of A and B with another element therebetween.

Embodiment 1

Embodiment 1 will be described below with reference to FIGS. 1 to 4.

FIG. 1 is a sectional view of an example substrate (directional coupler) according to Embodiment 1. The substrate is denoted by 5, and the directional coupler is denoted by 1.

The directional coupler 1 includes a substrate 5, a main line 10, a first sub-line 20, and a ground conductor 30. The main line 10, the first sub-line 20, and the ground conductor 30 are located in the substrate 5. The directional coupler 1 can measure power of a signal passing through the main line 10. Measurement is conducted with an aid of the first sub-line 20, which is able to be electromagnetically coupled to the main line 10.

The substrate 5 is a dielectric substrate including a plurality of dielectric layers. The substrate 5 has a first main surface 51 (e.g., a front surface) and a second main surface 52 (e.g., a back surface), and the dielectric layers are located between these main surfaces. For example, conductors, such as conductor wiring patters or conductor films are disposed on the first main surface 51, on the second main surface 52, or in the dielectric layers in a manner so as to extend substantially parallel to the first main surface 51 and the second main surface 52. Conductors such as via conductors extend in the thickness direction of the substrate 5, that is, in the direction substantially perpendicular to the first main surface 51 and the second main surface 52. The conductors provided in or on the substrate 5 are made mainly of Al, Cu, Au, Ag, or an alloy of these metals.

Figure 2:
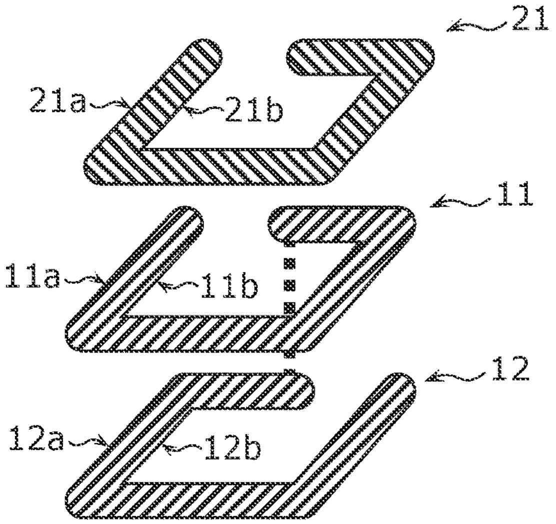
FIG. 2 is a perspective view of a first conductor line, a second conductor line, and a third conductor line, which are illustrated as examples of conductor lines in Embodiment 1.

The main line 10 includes a first conductor line 11 and a second conductor line 12, which are electrically connected to each other. Referring to FIG. 2, which will be described later, a via conductor extending between an end of the first conductor line 11 and an end of the second conductor line 12 forms an electrical connection between the first conductor line 11 and the second conductor line 12. The first conductor line 11 and the second conductor line 12 are electrically connected to each other to constitute the main line 10.

The first sub-line 20 includes a third conductor line 21. The first conductor line 11 and the second conductor line 12 are able to be electromagnetically coupled to the third conductor line 21. More specifically, at least part of the first conductor line 11 and at least part of the second conductor line 12 are located within the third conductor line 21 when the substrate 5 is viewed in plan, in which case the first conductor line 11 and the second conductor line 12 are able to be electromagnetically coupled to the third conductor line 21. The electromagnetic coupling may be capacitive coupling and/or magnetic field coupling.

The ground conductor 30 is a conductor coupled to the ground. At least part of the first conductor line 11, at least part of the second conductor line 12, and at least part of the third conductor line 21 are located within the ground conductor 30 when the substrate 5 is viewed in plan.

The first conductor line 11, the second conductor line 12, the third conductor line 21, and the ground conductor 30 are disposed on different layers of the substrate 5. More specifically, the first conductor line 11, the second conductor line 12, and the third conductor line 21, and the ground conductor 30 in the substrate 5 are located in different positions in the thickness direction of the substrate 5 such that the first conductor line 11, the second conductor line 12, the third conductor line 21, and the ground conductor 30 are disposed on different layers of the substrate 5. In some embodiments, the ground conductor 30 is disposed on the second main surface 52, and/or the third conductor line 21 is disposed on the first main surface 51. The first conductor line 11, the second conductor line 12, the third conductor line 21, and the ground conductor 30 are arranged in the order of the third conductor line 21, the first conductor line 11, the second conductor line 12, and the ground conductor 30 when the substrate 5 is viewed in cross section.

For example, the distance between the first conductor line 11 and the second conductor line 12 is shorter than the distance between the first conductor line 11 and the third conductor line 21 when the substrate 5 is viewed in cross section. The degree of coupling between the second conductor line 12 and the third conductor line 21 decreases with increasing distance between the first conductor line 11 and the second conductor line 12, thus making it difficult for the first conductor line 11 and the second conductor line 12 to act as the main line 10, that is, as one line in relation to the third conductor line 21. When being disposed in close proximity to each other, the first conductor line 11 and the second conductor line 12 can act as the main line 10, that is, as one line in relation to the third conductor line 21.

The first conductor line 11, the second conductor line 12, and the third conductor line 21 will be described in detail below with reference to FIGS. 2 and 3.

FIG. 2 is a perspective view of the first conductor line 11, the second conductor line 12, and the third conductor line 21, which are illustrated as examples of conductor lines in Embodiment 1. The constituent elements other than the first conductor line 11, the second conductor line 12, and the third conductor line 21 are not illustrated in FIG. 2. In FIG. 2, the via conductor that forms a connection between the first conductor line 11 and the second conductor line 12 is denoted by a broken line.

Figure 3:
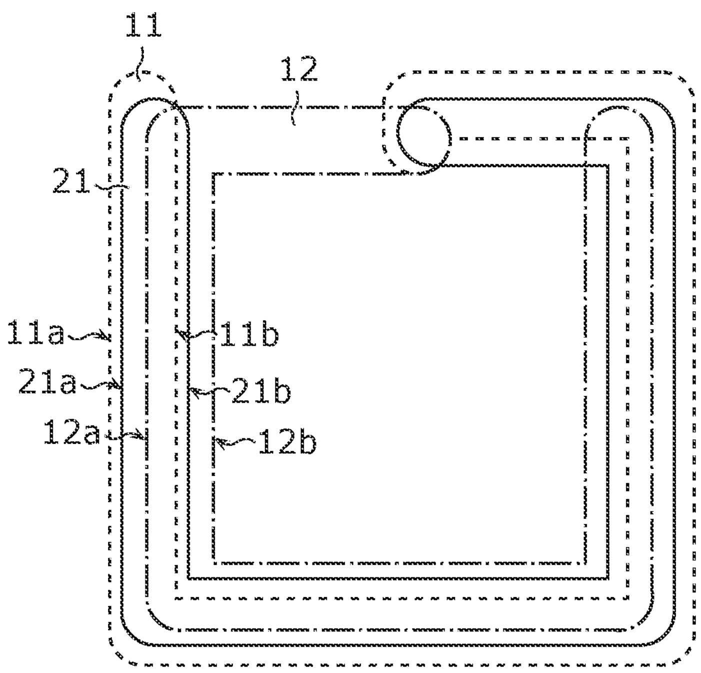
FIG. 3 is a plan view of the first conductor line, the second conductor line, and the third conductor line, which are illustrated as examples of conductor lines in Embodiment 1.

FIG. 3 is a plan view of the first conductor line 11, the second conductor line 12, and the third conductor line 21, which are illustrated as examples of conductor lines in Embodiment 1. The constituent elements other than the first conductor line 11, the second conductor line 12, and the third conductor line 21 are not illustrated in FIG. 3. In FIG. 3, the first conductor line 11, the second conductor line 12, and the third conductor line 21 are denoted by a broken line, a dash-dot line, and a solid line, respectively. The first conductor line 11, the second conductor line 12, and the third conductor line 21 are seen through for greater clarity of the positional relationship among the first conductor line 11, the second conductor line 12, and the third conductor line 21 in the substrate 5 viewed in plan.

The first conductor line 11, the second conductor line 12, and the third conductor line 21 each extends in a manner so as to surround a region. For example, the first conductor line 11, the second conductor line 12, and the third conductor line 21 each has an inner periphery and an outer periphery, each of which defines a substantially polygonal shape or, more specifically, a substantially rectangular shape. In some embodiments, the first conductor line 11, the second conductor line 12, and the third conductor line 21 each has the shape of a circumference.

The first conductor line 11 has a first edge 11*a* and a second edge 11*b*, which extend in a longitudinal direction and are located on opposite sides. The longitudinal direction is the direction in which the first conductor line 11 extends when the substrate 5 is viewed in plan. Each of the first edge 11*a* and the second edge 11*b* is an edge of the first conductor line 11 and extends in the longitudinal direction of the first conductor line 11. The first edge 11*a* and the second edge 11*b* each may be an edge of part of the first conductor line 11 or may be an edge of the entirety of the first conductor line 11. In a case where the first conductor line 11 extends in such a manner that its inner and outer peripheries each defines a substantially rectangular shape, the first edge 11*a* and the second edge 11*b* each may be an edge on one side of the substantially rectangular shape or each may be an edge on the four sides of the substantially rectangular shape. In a case where the first conductor line 11 has the shape of a circumference, the first edge 11*a* and the second edge 11*b* each may be an edge on part of the circumference or may be an edge on the entirety of the circumference.

The second conductor line 12 has a third edge 12*a* and a fourth edge 12*b*, which extend in a longitudinal direction and are located on opposite sides. The longitudinal direction is the direction in which the second conductor line 12 extends when the substrate 5 is viewed in plan. Each of the third edge 12*a* and the fourth edge 12*b* is an edge of the second conductor line 12 and extends in the longitudinal direction of the second conductor line 12. The third edge 12*a* and the fourth edge 12*b* each may be an edge of part of the second conductor line 12 or may be an edge of the entirety of the second conductor line 12. In a case where the second conductor line 12 extends in such a manner that its inner and outer peripheries each defines a substantially rectangular shape, the third edge 12*a* and the fourth edge 12*b* each may be an edge on one side of the substantially rectangular shape or each may be an edge on the four sides of the substantially rectangular shape. In a case where the second conductor line 12 has the shape of a circumference, the third edge 12*a* and the fourth edge 12*b* each may be an edge on part of the circumference or may be an edge on the entirety of the circumference.

The third conductor line 21 has a fifth edge 21*a* and a sixth edge 21*b*, which extend in the longitudinal direction and are located on opposite sides. The longitudinal direction is the direction in which the third conductor line 21 extends when the substrate 5 is viewed in plan. Each of the fifth edge 21*a* and the sixth edge 21*b* is an edge of the third conductor line 21 and extends in the longitudinal direction of the third conductor line 21. The fifth edge 21*a* and the sixth edge 21*b* each may be an edge of part of the third conductor line 21 or may be an edge of the entirety of the third conductor line 21. In a case where the third conductor line 21 extends in such a manner that its inner and outer peripheries each defines a substantially rectangular shape, the fifth edge 21*a* and the sixth edge 21*b* each may be an edge on one side of the substantially rectangular shape or each may be an edge on the four sides of the substantially rectangular shape. In a case where the third conductor line 21 has the shape of a circumference, the fifth edge 21*a* and the sixth edge 21*b* each may be an edge on part of the circumference or may be an edge on the entirety of the circumference.

It is not required the first conductor line 11 and the second conductor line 12 be equal in width. For example, the second conductor line 12 may be narrower than the first conductor line 11. The second conductor line 12 is closer than the first conductor line 11 to the ground conductor 30. The width of the second conductor line 12 may be reduced to shorten the distance between the ground conductor 30 and the second conductor line 12.

The first conductor line 11, the second conductor line 12, and the third conductor line 21 are disposed in such a manner that the first edge 11*a*, the fifth edge 21*a*, the third edge 12*a*, the second edge 11*b*, the sixth edge 21*b*, and the fourth edge 12*b* are arranged in this order when the substrate 5 is viewed in plan (see FIG. 3). With the first conductor line 11 and the third conductor line 21 being disposed as above, the first edge 11*a* of the first conductor line 11 is located on the outer side with respect to the fifth edge 21*a* of the third conductor line 21 when the substrate 5 is viewed in plan. Similarly, the second edge 11*b* of the first conductor line 11 is located on the outer side with respect to the sixth edge 21*b* of the third conductor line 21 when the substrate 5 is viewed in plan. With the second conductor line 12 and the third conductor line 21 being disposed as above, the fourth edge 12*b* of the second conductor line 12 is located on the inner side with respect to the sixth edge 21*b* of the third conductor line 21 when the substrate 5 is viewed in plan. Similarly, the third edge 12*a* of the second conductor line 12 is located on the inner side with respect to the fifth edge 21*a* of the third conductor line 21 when the substrate 5 is viewed in plan. Regarding the positional relationship among the first edge 11*a*, the second edge 11*b*, the third edge 12*a*, the fourth edge 12*b*, the fifth edge 21*a*, and the sixth edge 21*b*, the inner side refers to a region close to the fourth edge 12*b*, and the outer side refers to a region close to the first edge 11*a*. In a case where the conductor lines each extends in a manner so as to surround a region, the inner side is close to the midsection of the winding turn of each conductor line, and the outer side is opposite the midsection with the inner side therebetween.

The first edge 11*a*, the fifth edge 21*a*, the third edge 12*a*, the second edge 11*b*, the sixth edge 21*b*, and the fourth edge 12*b* are not necessarily arranged in this order throughout the entire length of the first conductor line 11, the second conductor line 12, and the third conductor line 21 when the substrate 5 is viewed in plan. It is only required that the first edge 11*a*, the fifth edge 21*a*, the third edge 12*a*, the second edge 11*b*, the sixth edge 21*b*, the fourth edge 12*b* be arranged in this order in a region including at least part of the first conductor line 11, at least part of the second conductor line 12, and at least part of the third conductor line 21 when the substrate 5 is viewed in plan.

The main line 10 may include a fourth conductor line 13 and a fifth conductor line 14 in addition to the first conductor line 11 and the second conductor line 12. This will be described below with reference to FIG. 4.

Figure 4:
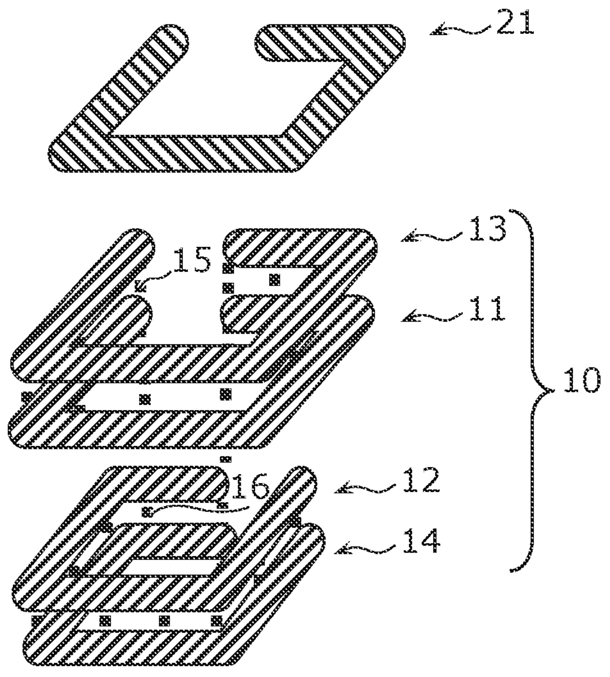
FIG. 4 is a perspective view of the first conductor line, the second conductor line, the third conductor line, a fourth conductor line, and a fifth conductor line, which are illustrated as examples of conductor lines in Embodiment 1.

FIG. 4 is a perspective view of the first conductor line 11, the second conductor line 12, the third conductor line 21, the fourth conductor line 13, and the fifth conductor line 14, which are illustrated as examples of conductor lines in Embodiment 1. The constituent elements other than the first conductor line 11, the second conductor line 12, the third conductor line 21, the fourth conductor line 13, and the fifth conductor line 14 are not illustrated in FIG. 4. In FIG. 4, via conductors 15 and via conductors 16 as well as the via conductor line forming a connection between the first conductor line 11 and the second conductor line 12 are denoted by broken lines. The first via conductors 15 each forms a connection between the first conductor line 11 and the fourth conductor line 13. The second via conductors 16 each forms a connection between the second conductor line 12 and the fifth conductor line 14.

The fourth conductor line 13 is located between the third conductor line 21 and the first conductor line 11 when the substrate 5 is viewed in cross section. For example, the fourth conductor line 13 and the first conductor line 11 have substantially the same shape and mostly overlap each other when the substrate 5 is viewed in plan. The first via conductors 15 each forming a connection between the first conductor line 11 and the fourth conductor line 13 are provided in large numbers. Thus, the first conductor line 11 and the fourth conductor line 13 can act as one thick conductor line.

The fifth conductor line 14 is located between the second conductor line 12 and the ground conductor 30 when the substrate 5 is viewed in cross section. For example, the fifth conductor line 14 and the second conductor line 12 have substantially the same shape and mostly overlap each other when the substrate 5 is viewed in plan. The second via conductors 16 each forming a connection between the second conductor line 12 and the fifth conductor line 14 are provided in large numbers. Thus, the second conductor line 12 and the fifth conductor line 14 can act as one thick conductor line.

As described above, the directional coupler 1 includes the substrate 5, the main line 10 in the substrate 5, the first sub-line 20 in or on the substrate 5, and the ground conductor 30 in or on the substrate 5. The main line 10 includes the first conductor line 11 and the second conductor line 12, which are electrically connected to each other. The first sub-line 20 includes the third conductor line 21. The first conductor line 11 and the second conductor line 12 are able to be electromagnetically coupled to the third conductor line 21. The first conductor line 11 and the second conductor line 12 are disposed on different layers of the substrate 5. The first conductor line 11, the second conductor line 12, the third conductor line 21, and the ground conductor 30 are arranged in the order of the third conductor line 21, the first conductor line 11, the second conductor line 12, and the ground conductor 30 when the substrate 5 is viewed in cross section. The first conductor line 11 has the first edge 11*a* and the second edge 11*b*, which extend in the longitudinal direction and are located on opposite sides. The second conductor line 12 has the third edge 12*a* and the fourth edge 12*b*, which extend in the longitudinal direction and are located on opposite sides. The third conductor line 21 has the fifth edge 21*a* and the sixth edge 21*b*, which extend in the longitudinal direction and are located on opposite sides. The first conductor line 11, the second conductor line 12, and the third conductor line 21 are disposed in such a manner that the first edge 11*a*, the fifth edge 21*a*, the third edge 12*a*, the second edge 11*b*, the sixth edge 21*b*, and the fourth edge 12*b* are arranged in this order when the substrate 5 is viewed in plan.

When the substrate 5 is viewed in plan, the first edge 11*a* of the first conductor line 11 is located on the outer side with respect to the fifth edge 21*a* of the third conductor line 21, and the second edge 11*b* of the first conductor line 11 is located on the outer side with respect to the sixth edge 21*b* of the third conductor line 21. The third conductor line 21 overlaps the first conductor line 11 in such a manner that the sixth edge 21*b* of the third conductor line 21 lies off the second edge 11*b* of the first conductor line 11 when the substrate 5 is viewed in plan. When the substrate 5 is viewed in plan, the fourth edge 12*b* of the second conductor line 12 is located on the inner side with respect to the sixth edge 21*b* of the third conductor line 21, and the third edge 12*a* of the second conductor line 12 is located on the inner side with respect to the fifth edge 21*a* of the third conductor line 21. The third conductor line 21 overlaps the second conductor line 12 in such a manner that the fifth edge 21*a* of the third conductor line 21 lies off the third edge 12*a* of the second conductor line 12 when the substrate 5 is viewed in plan. When the substrate 5 is viewed in plan, the first conductor line 11 and the second conductor line 12 overlap each other, and the third conductor line 21 is located within the first conductor line 11 and the second conductor line 12 in a manner so as to lie off neither each edge of the first conductor line 11 nor each edge of the second conductor line 12. In light of impedance adjustment, it is not required that the first conductor line 11 and the second conductor line 12 each be wider than the third conductor line 21.

That is, it is not required that the first conductor line 11 and the second conductor line 12 included in the main line 10 each be wider than the third conductor line 21 included in the first sub-line 20. This eliminates the need to increase the distance between the ground conductor 30 and the main line 10. In other words, there is no need to increase the thickness of the substrate 5.

The distance between the first edge 11*a* of the first conductor line 11 and the fourth edge 12*b* of the second conductor line 12 may be regarded as the width of the main line 10 in the substrate 5 viewed in plan. If the layers constituting the substrate 5 become misaligned in such a manner that the third conductor line 21 is shifted toward the fifth edge 21*a* or the sixth edge 21*b*, the third conductor line 21 is kept form lying off the edges of the main line 10 in the substrate 5 viewed in plan. This eliminates or reduces the possibility that the degree of coupling between the main line 10 and the first sub-line 20 will vary from place to place.

This feature enables impedance adjustment in such a way as to minimize variation in the degree of coupling without necessarily the need to increase the thickness of the substrate 5.

The distance between the first conductor line 11 and the second conductor line 12 may be shorter than the distance between the first conductor line 11 and the third conductor line 21 when the substrate 5 is viewed in cross section.

When being disposed in close proximity to each other, the first conductor line 11 and the second conductor line 12 can act as the main line 10, that is, as one wide line in relation to the third conductor line 21.

It is not required the first conductor line 11 and the second conductor line 12 be equal in width.

That is, providing lines of the same width as the first conductor line 11 and the second conductor line 12 is not a design requirement.

For example, the second conductor line 12 may be narrower than the first conductor line 11.

The second conductor line 12 is closer than the first conductor line 11 to the ground conductor 30. The width of the second conductor line 12 may be reduced to shorten the distance between the ground conductor 30 and the second conductor line 12, and the thickness of the substrate 5 may be reduced correspondingly.

The main line 10 may include the fourth conductor line 13 and the fifth conductor line 14 in addition to the first conductor line 11 and the second conductor line 12. The fourth conductor line 13 may be located between the third conductor line 21 and the first conductor line 11 when the substrate 5 is viewed in cross section. The fifth conductor line 14 may be located between the second conductor line 12 and the ground conductor 30 when the substrate 5 is viewed in cross section. The first via conductors 15 each forms a connection between the first conductor line 11 and the fourth conductor line 13. The second via conductors 16 each forms a connection between the second conductor line 12 and the fifth conductor line 14.

Thus, the first conductor line 11 and the fourth conductor line 13 can act as one thick conductor line, and the second conductor line 12 and the fifth conductor line 14 can act as one thick conductor line. The power loss in the main line 10 including the first conductor line 11, the fourth conductor line 13, the second conductor line 12, and the fifth conductor line 14 is reduced accordingly.

Embodiment 2

Embodiment 2 will be described below with reference to FIGS. 5 to 9.

Figure 5:
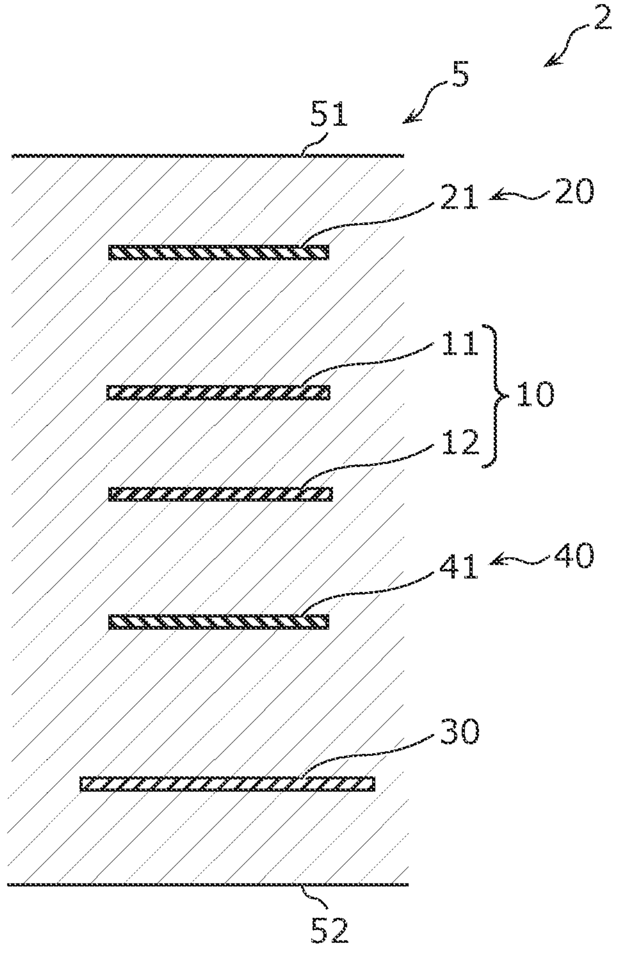
FIG. 5 is a sectional view of an example substrate (directional coupler) according to Embodiment 2.

FIG. 5 is a sectional view of an example substrate (directional coupler) according to Embodiment 2. The substrate is denoted by 5, and the directional coupler is denoted by 2.

The directional coupler 2 includes the substrate 5, the main line 10, the first sub-line 20, a second sub-line 40, and the ground conductor 30. The main line 10, the first sub-line 20, the second sub-line 40, and the ground conductor 30 are located in the substrate 5. The directional coupler 2 can measure power of a signal passing through the main line 10. Measurement is conducted with an aid of the first sub-line 20 and the second sub-line 40, each of which is able to be electromagnetically coupled to the main line 10. The directional coupler 2 differs from the directional coupler 1 according to Embodiment 1 in that the second sub-line 40 is included. The directional coupler 2 is otherwise identical to the directional coupler 1 according to Embodiment 1, which will not be further elaborated here.

The second sub-line 40 includes a sixth conductor line 41. The first conductor line 11 and the second conductor line 12 are able to be electromagnetically coupled to the sixth conductor line 41. More specifically, at least part of the first conductor line 11 and at least part of the second conductor line 12 are located within the sixth conductor line 41 when the substrate 5 is viewed in plan, in which case the first conductor line 11 and the second conductor line 12 are able to be electromagnetically coupled to the sixth conductor line 41. The electromagnetic coupling may be capacitive coupling and/or magnetic field coupling.

The sixth conductor line 41 is located between the second conductor line 12 and the ground conductor 30 when the substrate 5 is viewed in cross section. The first conductor line 11, the second conductor line 12, the third conductor line 21, the sixth conductor line 41, and the ground conductor 30 are arranged in the order of the third conductor line 21, the first conductor line 11, the second conductor line 12, the sixth conductor line 41, and the ground conductor 30 when the substrate 5 is viewed in cross section.

For example, the distance between the first conductor line 11 and the second conductor line 12 is shorter than the distance between the second conductor line 12 and the sixth conductor line 41 when the substrate 5 is viewed in cross section. The degree of coupling between the first conductor line 11 and the sixth conductor line 41 decreases with increasing distance between the first conductor line 11 and the second conductor line 12, thus making it difficult for the first conductor line 11 and the second conductor line 12 to act as the main line 10, that is, as one line in relation to the sixth conductor line 41. When being disposed in close proximity to each other, the first conductor line 11 and the second conductor line 12 can act as the main line 10, that is, as one line in relation to the sixth conductor line 41.

The sixth conductor line 41 will be described in detail below with reference to FIG. 6.

Figure 6:
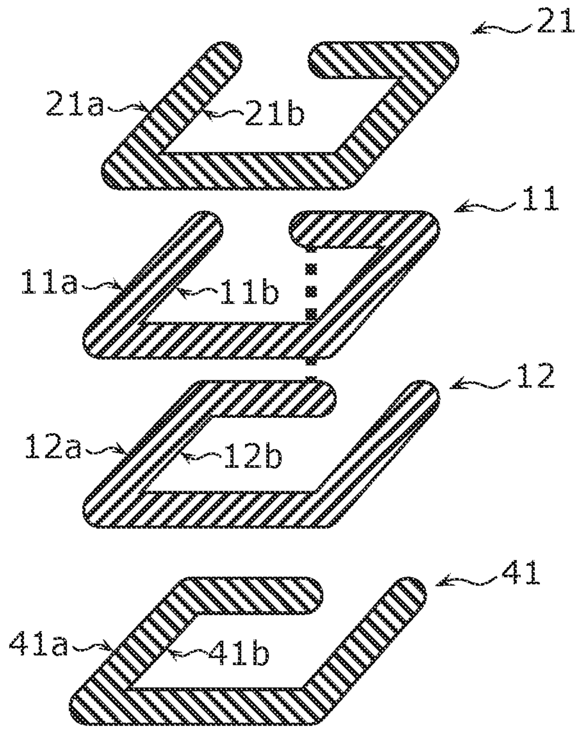
FIG. 6 is a perspective view of a first conductor line, a second conductor line, a third conductor line, and a sixth conductor line, which are illustrated as examples of conductor lines in Embodiment 2.

FIG. 6 is a perspective view of the first conductor line 11, the second conductor line 12, the third conductor line 21, and the sixth conductor line 41, which are illustrated as examples of conductor lines in Embodiment 2. The constituent elements other than the first conductor line 11, the second conductor line 12, the third conductor line 21, and the sixth conductor line 41 are not illustrated in FIG. 6. In FIG. 6, the via conductor that forms a connection between the first conductor line 11 and the second conductor line 12 is denoted by a broken line.

The sixth conductor line 41 extends in a manner so as to surround a region. For example, the sixth conductor line 41 has an inner periphery and an outer periphery, each of which defines a substantially polygonal shape or, more specifically, a substantially rectangular shape. In some embodiments, the sixth conductor line 41 has the shape of a circumference.

The sixth conductor line 41 has a seventh edge 41*a* and an eighth edge 41*b*, which extend in a longitudinal direction and are located on opposite sides. The longitudinal direction is the direction in which the sixth conductor line 41 extends when the substrate 5 is viewed in plan. Each of the seventh edge 41*a* and the eighth edge 41*b* is an edge of the sixth conductor line 41 and extends in the longitudinal direction of the sixth conductor line 41. The seventh edge 41*a* and the eighth edge 41*b* each may be an edge of part of the sixth conductor line 41 or may be an edge of the entirety of the sixth conductor line 41. In a case where the sixth conductor line 41 extends in such a manner that its inner and outer peripheries each defines a substantially rectangular shape, the seventh edge 41*a* and the eighth edge 41*b* each may be an edge on one side of the substantially rectangular shape or each may be an edge on the four sides of the substantially rectangular shape. In a case where the sixth conductor line 41 has the shape of a circumference, the seventh edge 41*a* and the eighth edge 41*b* each may be an edge on part of the circumference or may be an edge on the entirety of the circumference.

The first conductor line 11, the second conductor line 12, and the sixth conductor line 41 are disposed in such a manner that the first edge 11*a*, the seventh edge 41*a*, the third edge 12*a*, the second edge 11*b*, the eighth edge 41*b*, and the fourth edge 12*b* are arranged in this order when the substrate 5 is viewed in plan. With the first conductor line 11 and the sixth conductor line 41 being disposed as above, the first edge 11*a* of the first conductor line 11 is located on the outer side with respect to the seventh edge 41*a* of the sixth conductor line 41 when the substrate 5 is viewed in plan. Similarly, the second edge 11*b* of the first conductor line 11 is located on the outer side with respect to the eighth edge 41*b* of the sixth conductor line 41 when the substrate 5 is viewed in plan. With the second conductor line 12 and the sixth conductor line 41 being disposed as above, the fourth edge 12*b* of the second conductor line 12 is located on the inner side with respect to the eighth edge 41*b* of the sixth conductor line 41 when the substrate 5 is viewed in plan. Similarly, the third edge 12*a* of the second conductor line 12 is located on the inner side with respect to the seventh edge 41*a* of the sixth conductor line 41 when the substrate 5 is viewed in plan. Regarding the positional relationship among the first edge 11*a*, the second edge 11*b*, the third edge 12*a*, the fourth edge 12*b*, the seventh edge 41*a*, and the eighth edge 41*b*, the inner side refers to a region close to the fourth edge 12*b*, and the outer side refers to a region close to the first edge 11*a*. In a case where the conductor lines each extends in a manner so as to surround a region, the inner side is close to the midsection of the winding turn of each conductor line, and the outer side is opposite the midsection with the inner side therebetween. Although the positional relationship among the first conductor line 11, the second conductor line 12, and the sixth conductor line 41 in the substrate 5 viewed in plan is not illustrated in the accompanying drawings, the way in which the first conductor line 11 and the second conductor line 12 are placed in relation to the sixth conductor line 41 is analogous to the way in which the first conductor line 11 and the second conductor line 12 are placed in relation to the third conductor line 21 (see FIG. 3).

The first edge 11*a*, the seventh edge 41*a*, the third edge 12*a*, the second edge 11*b*, the eighth edge 41*b*, and the fourth edge 12*b* are not necessarily arranged in this order throughout the entire length of the first conductor line 11, the second conductor line 12, and the sixth conductor line 41 when the substrate 5 is viewed in plan. It is only required that the first edge 11*a*, the seventh edge 41*a*, the third edge 12*a*, the second edge 11*b*, the eighth edge 41*b*, the fourth edge 12*b* be arranged in this order in a region including at least part of the first conductor line 11, at least part of the second conductor line 12, and at least part of the sixth conductor line 41 when the substrate 5 is viewed in plan.

As mentioned above in relation to the previous embodiment, the main line 10 may include the fourth conductor line 13 and the fifth conductor line 14 in addition to the first conductor line 11 and the second conductor line 12. The same goes for the main line 10 in Embodiment 2.

Examples of the circuit configuration of the directional coupler 2 will be described below with reference to FIGS. 7 to 9.

Figure 7:
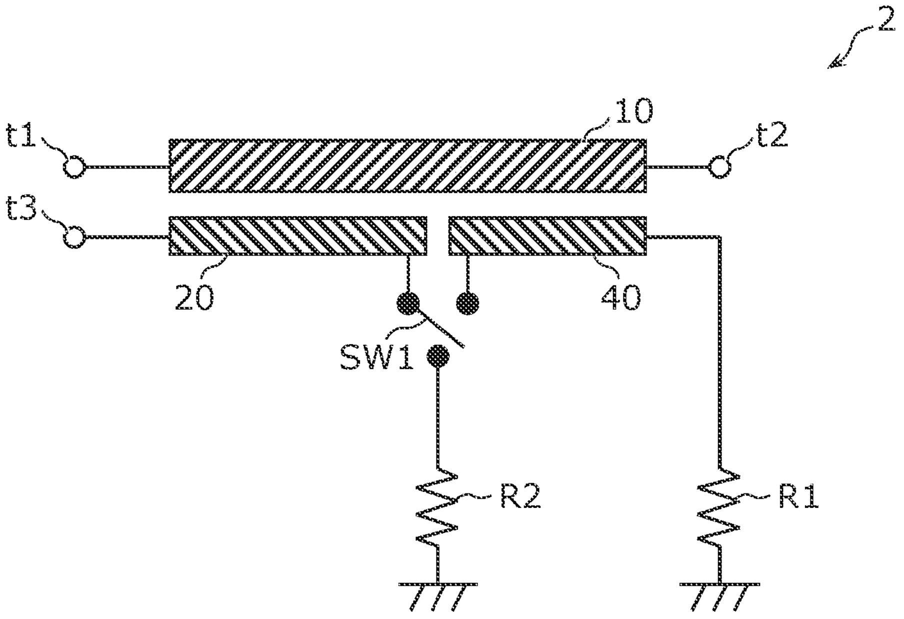
FIG. 7 is a diagram illustrating an example circuit configuration of the directional coupler according to Embodiment 2.
Figure 8:
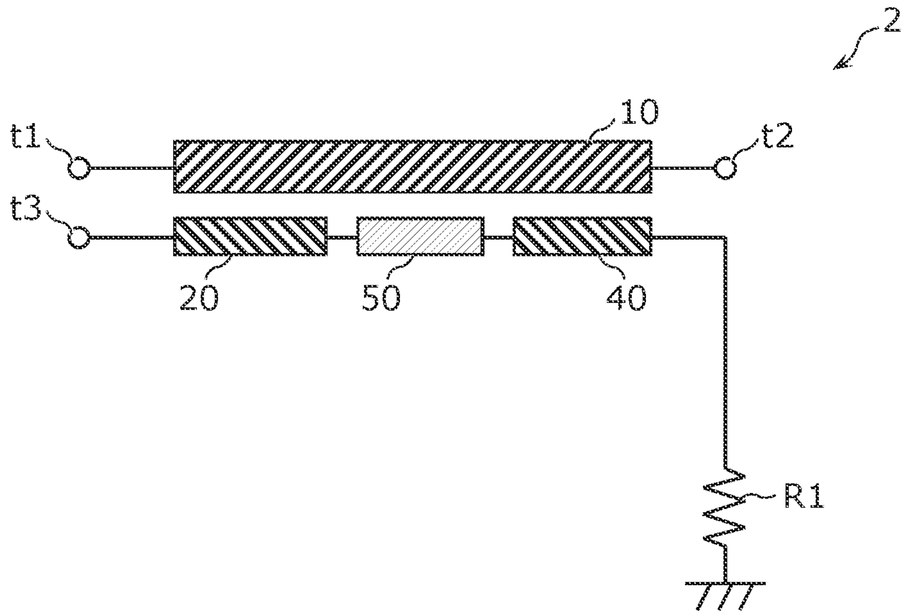
FIG. 8 is a diagram illustrating an example circuit configuration of the directional coupler according to Embodiment 2.
Figure 9:
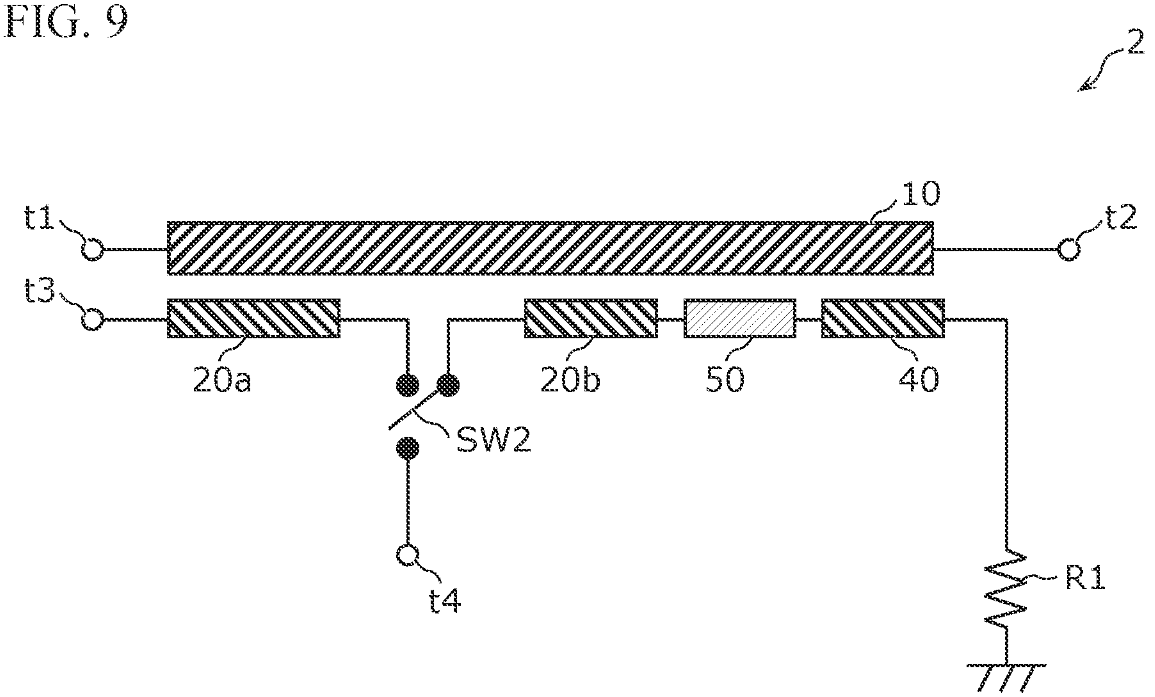
FIG. 9 is a diagram illustrating an example circuit configuration of the directional coupler according to Embodiment 2.

FIGS. 7 to 9 are diagrams each illustrating an example circuit configuration of the directional coupler according to Embodiment 2. Referring to FIGS. 7 to 9, t1 and t2 denote input/output terminals, and t3 denotes a detection terminal. Referring to FIG. 9, t4 denotes another detection terminal. A signal input to one of the input/output terminal t1 and t2 passes through the main line 10 and is then output from the other input/output terminal. For example, power of the signal passing through the main line 10 is measured at the detection terminal t3 or t4.

One end of the main line 10 is connected to the input/output terminal t1, and the other end of the main line 10 is connected to the input/output terminal t2. A signal input to the input/output terminal t1 passes through the main line 10 and is then output from the input/output terminal t2. A signal input to the input/output terminal t2 passes through the main line 10 and is then output from the input/output terminal t1.

The following describes an example of the circuit configuration with reference to FIG. 7.

As illustrated in FIG. 7, the directional coupler 2 may include a switch SW1. The switch SW1 may be a single-pole, double-throw (SPDT) switch including a common terminal and two selection terminals. One end of the first sub-line 20 is connected to the detection terminal t3, and the other end of the first sub-line 20 is connected to the common terminal of the switch SW1. One end of the second sub-line 40 is connected to either one of two selection terminals of the switch SW1, and the other end of the second sub-line 40 is connected to a resistor R1. For example, the resistor R1 is a 50-ohm termination resistor. The other selection terminal of the switch SW1 is connected to a resistor R2. For example, the resistor R2 is a 50-ohm termination resistor.

The switch SW1 enables switching in relation to the connection between the first sub-line 20 and the second sub-line 40. More specifically, the switch SW1 enables switching between a state in which the first sub-line 20 and the second sub-line 40 are connected to each other and a state in which the first sub-line 20 and the second sub-line 40 are not connected to each other. The switch SW1 forms a connection between the first sub-line 20 and the resistor R2 in the state in which the first sub-line 20 and the second sub-line 40 are not connected to each other.

In the state in which the first sub-line 20 and the second sub-line 40 are connected to each other, the first sub-line 20 and the second sub-line 40 are used to measure, for example, the power of a signal passing through the main line 10. In the state in which the first sub-line 20 and the second sub-line 40 are not connected to each other, only the first sub-line 20 is used to measure, for example, the power of a signal passing through the main line 10. In this way, the switch SW1 enables switching in relation to the length of the sub-line. This feature enables multiband adaptation of the directional coupler 2.

The following describes another example of the circuit configuration with reference to FIG. 8.

As illustrated in FIG. 8, the directional coupler 2 may include a phase circuit 50, which is connected between the first sub-line 20 and the second sub-line 40. One end of the first sub-line 20 is connected to the detection terminal t3, and the other end of the first sub-line 20 is connected to one end of the phase circuit 50. One end of the second sub-line 40 is connected to the other end of the phase circuit 50, and the other end of the second sub-line 40 is connected to the resistor R1. The phase circuit 50 serves as a low-pass filter.

As a signal of higher frequency passes through the main line 10, the first sub-line 20 and the second sub-line 40 become more strongly coupled to the main line 10. This state raises the possibility that signals of high frequency will leak out of the main line 10 to flow into the first sub-line 20 and the second sub-line 40. As a workaround, the phase circuit 50 forms a connection between the first sub-line 20 and the second sub-line 40 in such a way as to adjust the phase of the first sub-line 20 and the phase of the second sub-line 40. This connection advantageously reduces the possibility that signals of high frequency will leak out of the main line 10 to flow into the first sub-line 20 and the second sub-line 40. This feature enables broadband adaptation of the directional coupler 2.

The following describes still another example of the circuit configuration with reference to FIG. 9.

As illustrated in FIG. 9, the directional coupler 2 may include the phase circuit 50 and a switch SW2. The switch SW2 may be an SPDT switch including a common terminal and two selection terminals. For example, the first sub-line 20 is composed of a sub-line segment 20*a* and a sub-line segment 20*b*. The phase circuit 50 is connected between the first sub-line 20 or, more specifically, the sub-line segment 20*b* and the second sub-line 40. One end of the sub-line segment 20*a* is connected to the detection terminal t3, and the other end of the sub-line segment 20*a* is connected to either one of two selection terminals of the switch SW2. One end of the sub-line segment 20*b* is connected to the common terminal of the switch SW2, and the other end of the sub-line segment 20*b* is connected to one end of the phase circuit 50. One end of the second sub-line 40 is connected to the other end of the phase circuit 50, and the other end of the second sub-line 40 is connected to the resistor R1. The other selection terminal of the switch SW2 is connected to the detection terminal t4.

The switch SW2 enables switching in relation to the length of the first sub-line 20. In other words, the switch SW2 enables switching in relation to the connection between the sub-line segment 20*a* and the sub-line segment 20*b*. More specifically, the switch SW2 enables switching between a state in which the sub-line segment 20*a* and the sub-line segment 20*b* are connected to each other and a state in which the sub-line segment 20*a* and the sub-line segment 20*b* are not connected to each other. In the state in which the sub-line segment 20*a* and the sub-line segment 20*b* are not connected to each other, the switch SW2 forms a connection between the sub-line segment 20*b* and the detection terminal t4.

In the state in which the sub-line segment 20*a* and the sub-line segment 20*b* are connected to each other, the sub-line segment 20*a*, the sub-line segment 20*b*, and the second sub-line 40 are used to measure, for example, the power of a signal passing through the main line 10. In the state in which the sub-line segment 20*a* and the sub-line segment 20*b* are not connected to each other, the sub-line segment 20*b* and the second sub-line 40 are used to measure, for example, the power of a signal passing through the main line 10. The phase circuit 50 forms a connection between the first sub-line 20 and the second sub-line 40 in such a way as to adjust the phase of the first sub-line 20 or, more specifically, the sub-line segment 20*b* and the phase of the second sub-line 40. This connection advantageously reduces the possibility that signals of high frequency will leak out of the main line 10 to flow into the first sub-line 20 and the second sub-line 40. This feature enables multiband and broadband adaptation of the directional coupler 2. For a low-band (LB) signal, the switch SW2 forms a connection between the sub-line segment 20*a* and the sub-line segment 20*b* such that the power of the LB signal passing through the main line 10 is measured at the detection terminal t3. For a high-band (HB) signal, the switch SW2 forms a connection between the sub-line segment 20*b* and the detection terminal t4 such that the power of the HB signal passing through the main line 10 is measured at the detection terminal t4.

As described above, the directional coupler 2 includes the second sub-line 40. The second sub-line 40 includes the sixth conductor line 41. The first conductor line 11 and the second conductor line 12 are able to be electromagnetically coupled to the sixth conductor line 41. The sixth conductor line 41 is located between the second conductor line 12 and the ground conductor 30 when the substrate 5 is viewed in cross section. The sixth conductor line 41 has the seventh edge 41*a* and the eighth edge 41*b*, which extend in the longitudinal direction and are located on opposite sides. The first conductor line 11, the second conductor line 12, and the sixth conductor line 41 are disposed in such a manner that the first edge 11*a*, the seventh edge 41*a*, the third edge 12*a*, the second edge 11*b*, the eighth edge 41*b*, and the fourth edge 12*b* are arranged in this order when the substrate 5 is viewed in plan.

As in the case with the first sub-line 20, the possibility that the degree of coupling between the main line 10 and the second sub-line 40 will vary from place to place is reduced without necessarily involving an increase in the thickness of the substrate 5. The main line 10 is disposed between the first sub-line 20 and the second sub-line 40 in such a manner that neither the first sub-line 20 nor the second sub-line 40 lies off the edges the main line 10 when the substrate 5 is viewed in plan. This layout improves the isolation between the first sub-line 20 and the second sub-line 40. The directional coupler 2 has improved directivity accordingly.

The distance between the first conductor line 11 and the second conductor line 12 may be shorter than the distance between the second conductor line 12 and the sixth conductor line 41 when the substrate 5 is viewed in cross section.

When being disposed in close proximity to each other, the first conductor line 11 and the second conductor line 12 can act as the main line 10, that is, as one wide line in relation to the sixth conductor line 41.

The directional coupler 2 may include the switch SW1, which enables switching in relation to the connection between the first sub-line 20 and the second sub-line 40.

The switch SW1 enables switching in relation to the length of the sub-line. This feature enables multiband adaptation of the directional coupler 2.

The directional coupler 2 may include the phase circuit 50, which is connected between the first sub-line 20 and the second sub-line 40.

As a signal of higher frequency passes through the main line 10, the first sub-line 20 and the second sub-line 40 become more strongly coupled to the main line 10. This state raises the possibility that signals of high frequency will leak out of the main line 10 to flow into the first sub-line 20 and the second sub-line 40. If such a signal of high frequency passes through the main line 10, significant amount of signal power would be lost. The phase circuit 50 forms a connection between the first sub-line 20 and the second sub-line 40 in such a way as to adjust the phase of the first sub-line 20 and the phase of the second sub-line 40. In this state, signals of high frequency are less likely to enter the first sub-line 20 and the second sub-line 40. That is, this connection advantageously reduces the possibility that signals of high frequency will leak out of the main line 10 to flow into the first sub-line 20 and the second sub-line 40. This feature enables broadband adaptation of the directional coupler 2.

The directional coupler 2 may include the switch SW2, which enables switching in relation to the length of the first sub-line 20.

This feature enables multiband and broadband adaptation of the directional coupler 2.

Other Embodiments

The directional couplers 1 and 2 have been described so far as embodiments of the present disclosure; nevertheless, these embodiments should not be construed as limiting the scope of the present disclosure. The present disclosure embraces: other embodiments implemented by varying combinations of constituent elements of the aforementioned embodiments; other modifications achieved through various alterations to the embodiments above that may be conceived by those skilled in the art within a range not departing from the spirit of the present disclosure; and various types of apparatuses including the directional coupler 1 or 2 according to the present disclosure.

An embodiment has been described above in which the distance between the first conductor line 11 and the second conductor line 12 is shorter than the distance between the first conductor line 11 and the third conductor line 21 when the substrate 5 is viewed in cross section. In some embodiments, the distance between the first conductor line 11 and the second conductor line 12 is longer than the distance between the first conductor line 11 and the third conductor line 21 when the substrate 5 is viewed in cross section.

An embodiment has been described above in which the second conductor line 12 is narrower than the first conductor line 11. In some embodiments, the second conductor line 12 is wider than the first conductor line 11.

An embodiment has been described above in which the first conductor line 11 and the second conductor line 12 have different widths. In some embodiments, the first conductor line 11 and the second conductor line 12 are substantially equal in width.

An embodiment has been described above in which the distance between the first conductor line 11 and the second conductor line 12 is shorter than the distance between the second conductor line 12 and the sixth conductor line 41 when the substrate 5 is viewed in cross section. In some embodiments, the distance between the first conductor line 11 and the second conductor line 12 is longer than the distance between the second conductor line 12 and the sixth conductor line 41 when the substrate 5 is viewed in cross section.

In some embodiments, the directional coupler 2 is a bidirectional coupler. For example, the first sub-line 20 is used to sense power of a signal input to the input/output terminal t1 and passing through the main line 10 to the input/output terminal t2, and the second sub-line 40 is used to sense power of a signal input to the input/output terminal t2 and passing through the main line 10 to the input/output terminal t1.

INDUSTRIAL APPLICABILITY

The present disclosure, or more specifically, a directional coupler capable of monitoring radio-frequency signals has wide applicability to communication apparatuses such as mobile phones.

What is claimed is:

1. A directional coupler, comprising:
- a substrate comprising a plurality of dielectric layers;
- a main line in the substrate;
- a first sub-line in or on the substrate; and
- a ground conductor in or on the substrate, wherein:
- the main line comprises a first conductor line and a second conductor line that are electrically connected to each other,
- the first sub-line comprises a third conductor line,
- the first conductor line and the second conductor line are electromagnetically coupled to the third conductor line,
- the first conductor line and the second conductor line are in different layers of the substrate,
- when the substrate is view in cross section, the first conductor line is between the third conductor line and the second conductor line, and the second conductor line is between the first conductor line and the ground conductor,
- the first conductor line has a first edge and a second edge that extend in a longitudinal direction and are on opposite sides,
- the second conductor line has a third edge and a fourth edge that extend in a longitudinal direction and are on opposite sides,
- the third conductor line has a fifth edge and a sixth edge that extend in a longitudinal direction and are on opposite sides, and
- when the substrate is viewed in plan view, the fifth edge is between the first edge and the third edge, the third edge is between the fifth edge and the second edge, the second edge is between the third edge and the sixth edge, and the sixth edge is between the second edge and the fourth edge.

2. The directional coupler according to claim 1, wherein when the substrate is viewed in cross section, a distance between the first conductor line and the second conductor line is shorter than a distance between the first conductor line and the third conductor line.

3. The directional coupler according to claim 1, wherein the first conductor line and the second conductor line have different widths.

4. The directional coupler according to claim 3, wherein the second conductor line is narrower than the first conductor line.

5. The directional coupler according to claim 1, wherein:
- the main line further comprises a fourth conductor line and a fifth conductor line,
- when the substrate is view in cross section, the fourth conductor line is between the third conductor line and the first conductor line, and the fifth conductor line is between the second conductor line and the ground conductor,
- the first conductor line and the fourth conductor line are connected to each other with a plurality of first via conductors therebetween, and
- the second conductor line and the fifth conductor line are connected to each other with a plurality of second via conductors therebetween.

6. The directional coupler according to claim 1, further comprising a second sub-line, wherein:
- the second sub-line comprises a sixth conductor line,
- the first conductor line and the second conductor line are electromagnetically coupled to the sixth conductor line,
- when the substrate is viewed in cross section, the sixth conductor line is between the second conductor line and the ground conductor,
- the sixth conductor line has a seventh edge and an eighth edge that extend in a longitudinal direction and are on opposite sides, and
- when the substrate is viewed in plan, the seventh edge is between the first edge and the third edge, the third edge is between the seventh edge and the second edge, the second edge is between the third edge and the eighth edge, and the eighth edge is between the second edge and the fourth edge.

7. The directional coupler according to claim 6, wherein when the substrate is viewed in cross section, a distance between the first conductor line and the second conductor line is shorter than a distance between the second conductor line and the sixth conductor line.

8. The directional coupler according to claim 6, further comprising a switch that is configured to selectively switch connection between the first sub-line and the second sub-line.

9. The directional coupler according to claim 6, further comprising a phase circuit that is connected between the first sub-line and the second sub-line.

10. The directional coupler according to claim 9, further comprising a switch that is configured to selectively change a length of the first sub-line.

* * * * *